INVENTORS
ROMAN F. SAUER
FELIX GÖSSEL
GERHARD ROLLFINKE

INVENTORS
ROMAN F. SAUER
FELIX GÖSSEL
GERHARD ROLLFINKE

United States Patent Office 3,522,956
Patented Aug. 4, 1970

3,522,956
TWIN AXLE BOGIE
Roman P. Sauer, Felix Gössel, and Gerhard Rollfinke, Keilberg, Germany, assignors to Firma Otto Sauer Achsenfabrik, Keilberg, Aschaffenburg, Germany
Filed June 10, 1968, Ser. No. 735,799
Claims priority, application Germany, June 24, 1967, S 110,497; Feb. 23, 1968, S 114,292
Int. Cl. B60g 9/02
U.S. Cl. 280—81　　　　　　　　　　　　　8 Claims

ABSTRACT OF THE DISCLOSURE

The rear axle of a twin axle bogie for vehicles, such as large trucks or trailers, is adapted to be shifted out of parallelism with respect to the front axle when the bogie swivels with respect to the vehicle chassis during turns. The shift of the rear axle is effected by a linkage assembly comprising a steering member rigidly affixed to the rear axle and extending forwardly and two horizontal lever arms extending in opposite directions and rigidly connected to one another by means of a vertical pin rotatably held in a sleeve secured to the bogie; one lever arm is attached to the chassis, while the other lever arm is hingedly connected to said steering member.

BACKGROUND OF THE INVENTION

It is known to provide large vehicle bodies, such as trucks or trailers, with a swiveling twin axle bogie, the rear axle of which is shifted out of parallelism with respect to the front axle by means of a linkage assembly when, during turns, an angle appears between the longitudinal axis of the chassis and that of the bogie. The linkage assembly is connected to the vehicle chassis on the one hand and to a steering member (rigidly affixed to the rear axle) on the other hand.

In known linkage assemblies, as the bogie swivels, a twin-armed lever is rotated in a vertical plane about a horizontal axis. The turning movements of the lever arms, however, do not correspond to the swinging movement between the bogie and the chassis; further, the hinging joint between the steering member and the lever arm describes a circular arc which leads to difficulties in attaching the steering member to the rear axle. The raising and lowering of the hinging joint of the steering member causes the appearance of a vertical component of the brake reaction forces. Consequently, the hinging joint is exposed to undesired stresses. Since only a small space is available for accommodating the vertically extending arms, their length has to be very limited. Further, no other parts of the bogie may be disposed within the path of movement of the levers, although the provision of elements in such space would be often desirable to increase stability and to achieve other favorable conditions.

SUMMARY AND ADVANTAGES OF THE INVENTION

The invention purports to eliminate the above and other disadvantages inherent in structures known heretofore.

Briefly stated, the actuating or linkage assembly for shifting the rear axle of a twin axle bogie out of parallelism with respect to the front axle thereof comprises a two-armed lever or actuating member, the arms of which extend horizontally in opposed (e.g. forward and rearward) directions and are vertically offset by a vertical, interconnecting pin rotatably held in a sleeve secured to the bogie. The upper horizontal lever is hingedly connected to the chassis, while the lower horizontal lever is hingedly attached to the steering member rigidly affixed to the rear axle.

The arms of the actuating member are adapted to swing in a horizontal plane without an upwardly directed movement component: this advantageously affects the securing elements of the steering member and does not give rise to undesired components of the brake reaction forces.

Due to the inventive structure, immediately under the leaf spring assemblies of the bogie there is ample space to accommodate a transversal support beam forming the axle of the entire bogie assembly. By virtue of the transversal beam the dynamic axle load shift during braking is reduced. Further, the transversal beam provides additional stability to the bogie.

Further, the inventive structure, by virtue of the increased available space, permits a more favorable dimensioning of the lengths and cross sections of the lever arms.

The invention will be better understood and further advantages will become apparent from the ensuing detailed specification of two embodiments taken in conjunction with the drawings.

DESCRIPTION OF A FIRST EMBODIMENT

Figure 1:
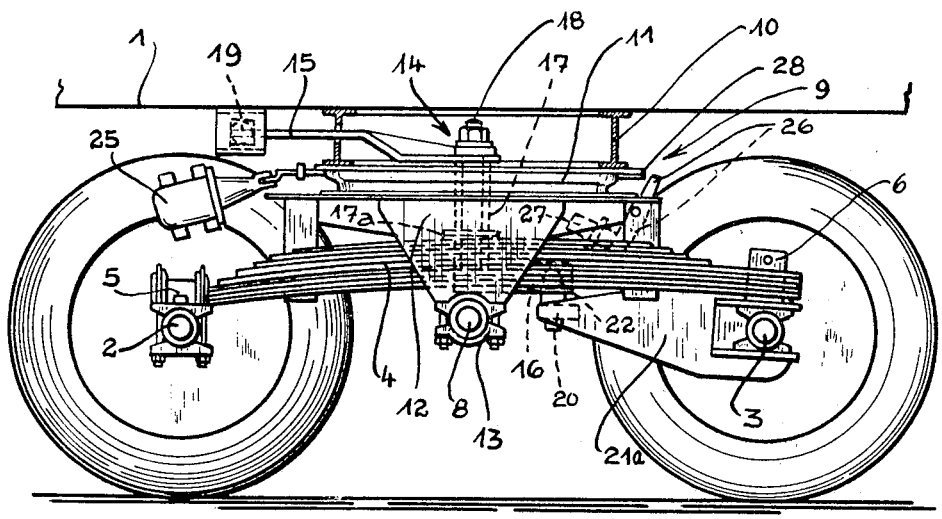
FIG. 1 is a schematic side elevational view of a first embodiment of the invention.
Figure 2:
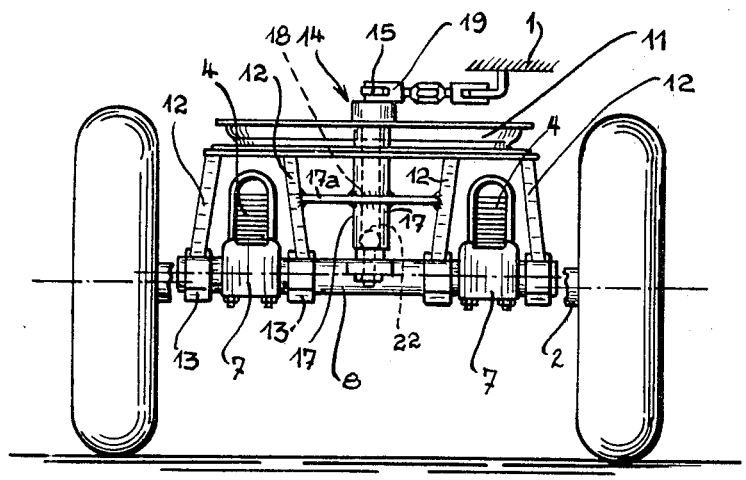
FIG. 2 is a schematic front elevational view of the same embodiment with the front axle partially broken away for clarity.
Figure 3:
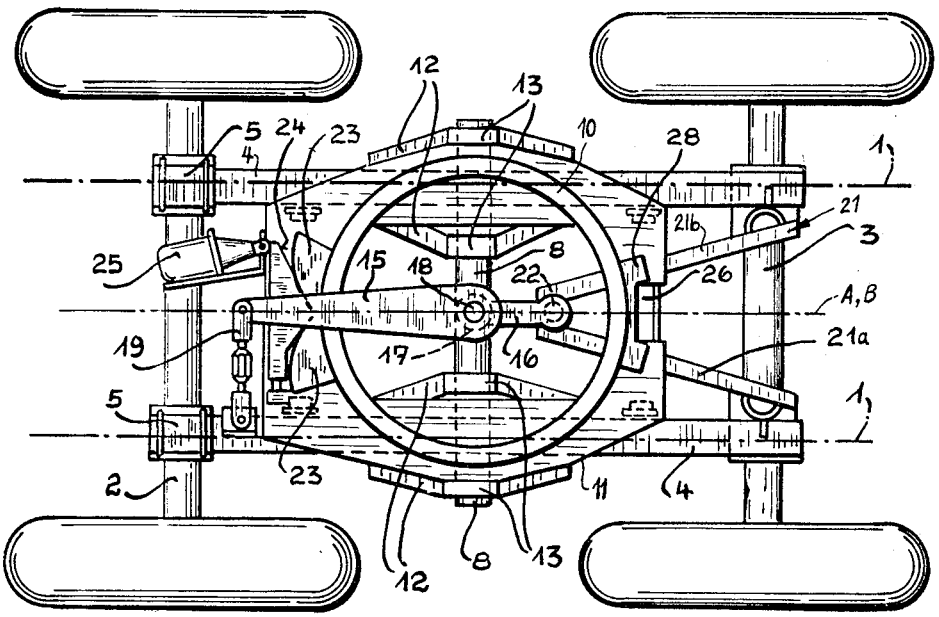
FIG. 3 is a schematic plan view of the same embodiment.

Turning now to FIGS. 1–4, the vehicle chassis 1 is supported by a twin axle bogie having a front axle 2 and a rear axle 3. The front ends of a pair of parallel spaced leaf spring assemblies 4 are rigidly secured to the front axle 2 by means of clamping yokes 5. The rear ends of the leaf spring assemblies 4 are slidably attached to the rear axle 3 by means of clamping yokes 6 (only one shown). Thus, the rear axle 3 may be shifted out of parallelism with respect to the front axle 2 as will be explained later.

Below the longitudinal mid portion of leaf spring assemblies 4 there extends, parallel to axles 2 and 3, a transversal beam 8 which forms the axle of the entire bogie assembly. The leaf spring assemblies 4 are rotatably secured at their mid portion to the beam 8 by means of clamping yokes 7. The spring assemblies 4 are adapted to oscillate about an axis which is at the approximate height of the wheel center lines. Above the leaf spring assemblies 4 (FIG. 1) there is disposed in a substantially horizontal position a ball bearing type ring assembly generally indicated at 9 and formed of an upper race way 10 and a lower race way 11. The cooperation between the two race ways permits a swiveling motion of the bogie with respect to the chassis.

The upper race way 10 is rigidly secured to the chassis 1, while the lower race way 11 is affixed to the top of two transversally spaced U-shaped brackets 12 (FIG. 2) having downwardly extending triangular side walls (FIG. 1). The lowest portions of said side walls carry clamps 13 by means of which the brackets 12 are secured to beam 8. The brackets 12 ensure high lateral stability of the bogie. The arrangement of supporting elements, such as brackets 12, within the space below the race way assembly 9 obviates the necessity of providing additional securing members attached to the chassis. This is particularly advantageous when the bogie is used on vehicles (particularly tank trucks) with exchangeable undercarriages.

For the steering of the rear axle 3 with respect to front axle 2 there is provided an actuating member generally indicated at 14 comprising an upper horizontal lever 15 and a lower horizontal lever 16. These levers are vertically spaced from and fixedly connected with one another by means of a vertical pin 18 rotatably held in a sleeve 17. The sleeve 17 is secured (e.g. by welding) to the brackets 12 by means of a girder 17a and is thus supported by the transverse beam 8. The free end of the upper lever 15 is hingedly attached to the chassis 1 by means of a lengthwise adjustable link 19.

To the rear axle 3 there is fixedly secured a triangular steering member generally indicated at 21 formed of two horizontally forwardly extending converging plate members 21a and 21b (FIGS. 3 and 4) each having a forked rear terminus (FIG. 1) straddling the rear axle 3 at spaced locations. The front terminus 20 of the triangular steering member 21 and the free end of the lower lever 16 are hingedly interconnected by means of a ball joint 22 disposed between the two leaf spring assemblies 4 at approximately the height thereof.

Turning one again to FIGS. 3 and 4, to the lower race way 11 there is fixedly secured an arcuately notched member 23 while to the upper race way 10 there is hingedly attached one end of a wedge-shaped member 24 adapted to cooperate with member 23. The other end of the wedge-shaped member 24 is connected to a cylinder assembly 25 exerting pressure on the wedge 24 which, as a result, is continuously urged against notched member 23. The assembly comprising elements 23, 24 and 25 tends to maintain the bogie in, or return the same into, a "straight ahead" position.

For locking the race way 11 with respect to the race way 10 during back-up of the vehicle, there is provided a lock formed of a cylinder assembly 27 and a locking bolt 26 which is pivotally secured to the lower race way 11 (FIG. 1). Further, to the upper race way 10 there is secured a catch plate 28 adapted to cooperate with the locking bolt 26. For backup, the driver actuates the cylinder assembly 27 to cause locking bolt 26 to engage the catch plate 28. At other times the locking bolt 26 is disengaged from catch plate 28 as shown in FIG. 1.

Figure 4:
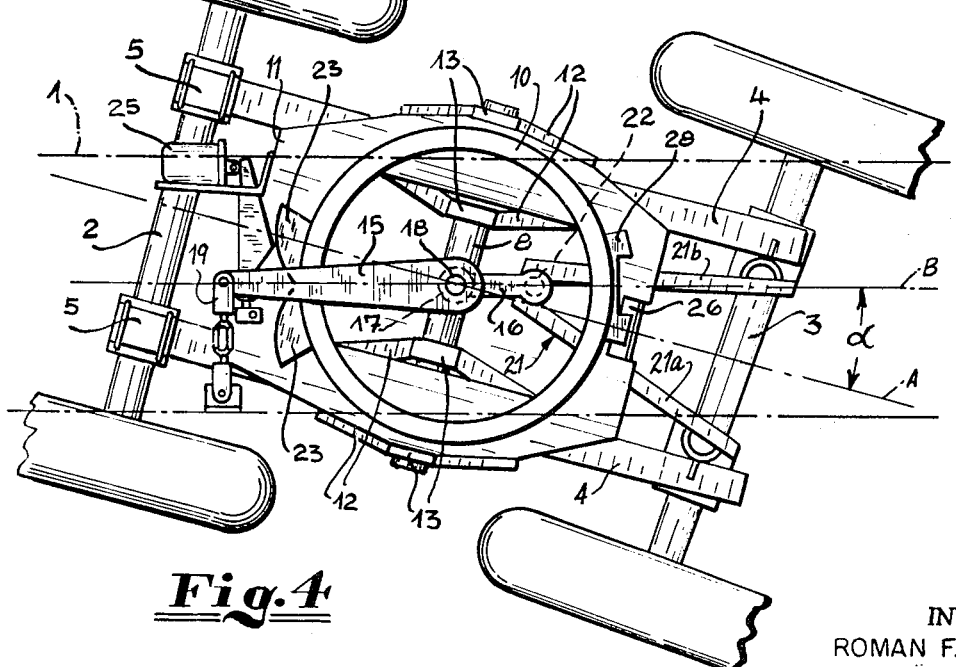
FIG. 4 is a view similar to FIG. 3 showing the bogie while negotiating a curve.

In FIG. 4 the bogie is shown while negotiating a left curve. Chassis 1 and the upper lever 15 have swung to the left. Since the bogie tends to maintain its original direction of travel, an angle α appears between the main axis A thereof and the longitudinal axis B of the vehicle chassis 1. The linkage assembly formed of link 19, arms 15, 16 and steering member 21 will cause rear axle 3 to turn in addition to angle α, shifting on the rear ends of leaf spring assemblies 4. Thus, when the bogie swivels with respect to chassis 1, the axles 2 and 3 assume a converging position towards the inside of the curve. Stated in different terms, the extended center lines of all axles of the vehicle intersect in the center of curvature of the turn to be negotiated. The extent of shift of rear axle 3 out of parallelism with respect to the front axle 2 depends upon the length ratio of levers 15 and 16.

When the vehicle resumes its straight-ahead travel, the axles 2 and 3 tend to do likewise; this motion is assisted by the mechanism comprising the notched plate 23, the wedge 24 and cylinder assembly 25.

A suitable setting of adjustable link 19 ensures an exact alignment of rear axle 3 with front axle 2 for straight line travel.

DESCRIPTION OF A SECOND EMBODIMENT

Figure 5:
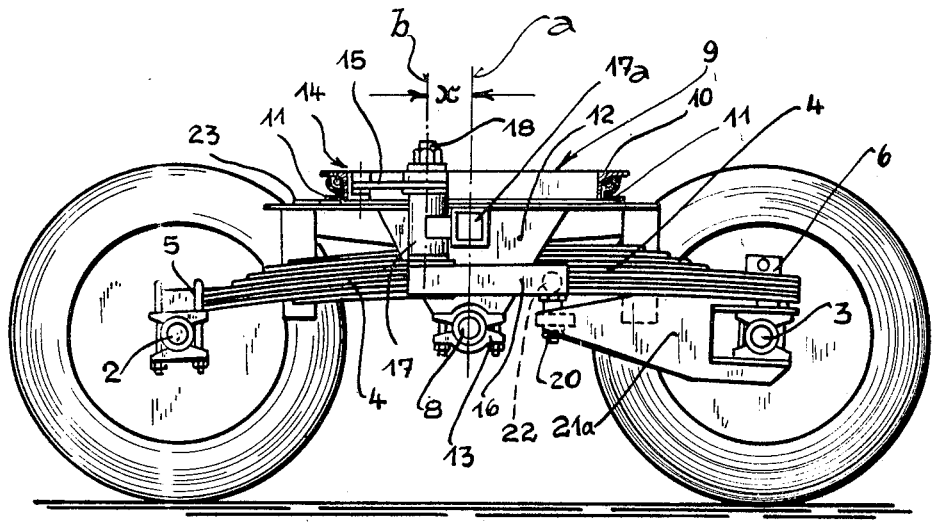
FIG. 5 is a schematic side elevational view of a second embodiment.
Figure 6:
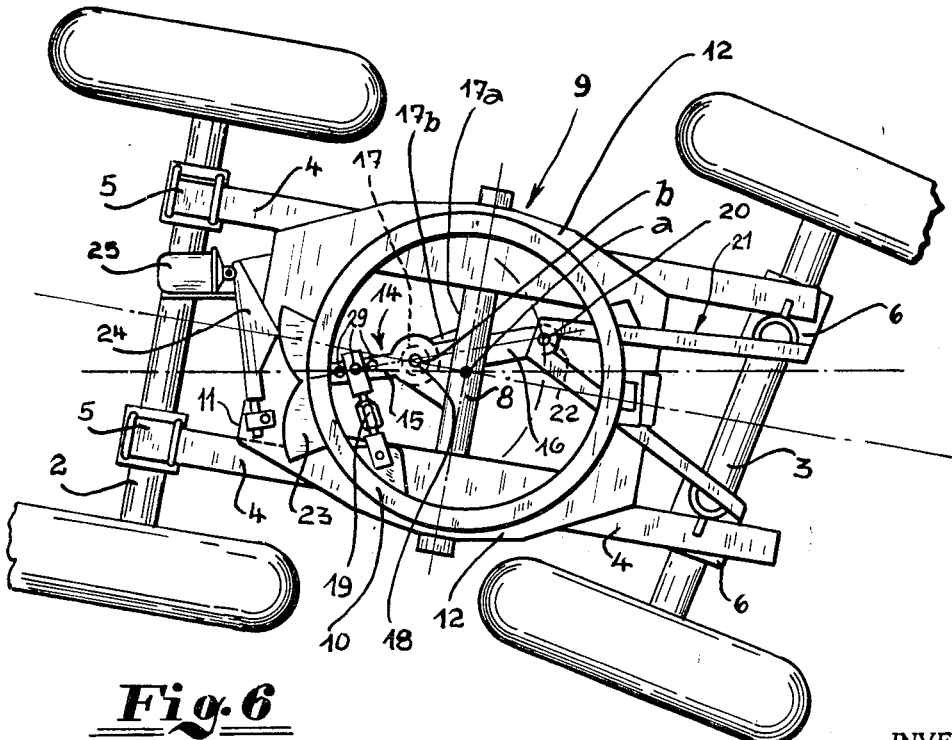
FIG. 6 is a schematic plan view of the embodiment of FIG. 5 showing the bogie while negotiating a curve.

Turning now to FIGS. 5 and 6, in the embodiment depicted therein the vertical sleeve 17 receiving pin 18 is attached to the brackets 12 by means of a girder 17a and a bracket 17b and is supported by the transverse beam 8 in such a manner that the vertical swiveling axis a intersecting the center line of the transverse beam 8, is at a distance x from the rotational axis b of the pin 18. In other structural details and in the mode of operation this embodiment is substantially identical to the embodiment described in connection with FIGS. 1–4.

The embodiment shown in FIG. 6 may be modified in such a manner that the sleeve 17 is disposed rearwardly rather than forwardly of the swiveling axis a of the bogie.

The aforedescribed second embodiment is particularly advantageous in that it permits a substantial freedom in varying the length ratio of levers 15 and 16 while remaining within the space below the race way assembly 9. As seen in FIG. 6, the arm 15 is provided with a plurality of longitudinally spaced openings 29. The said ratio may be determined by pivotally attaching link 19 to arm 15 at any selected one of openings 29.

The possibility of adjusting the length ratio of arms 15, 16 and thus varying the extent of the angular displacement of rear axle 3 with respect to front axle 2 at a given angular displacement of the bogie with respect to the vehicle chassis 1 is advantageous in that the bogie may be readily adapted for use on vehicles of different lengths which require, when negotiating curves, differing angular displacements between the rear axle 3 and the front axle 2 of the bogie.

That which is claimed is:

1. A twin axle bogie swivelably secured to a vehicle chassis by means of a race way assembly formed of a lower race way secured to said bogie and an upper race way secured to said chassis, said bogie including a front axle swingable with the bogie as a unit and a rear axle adapted to be displaced angularly with respect to said front axle when the longitudinal axis of said chassis is at an angle with respect to the longitudinal axis of said bogie, the improvement comprising,
 (A) a linkage assembly for effecting an angular displacement of said rear axle with respect to said front axle, said linkage assembly including
  (1) a forwardly extending steering member affixed to said rear axle,
  (2) an actuating member including
   (a) an upper horizontal lever arm hingedly attached to said chassis,
   (b) a lower horizontal lever arm hingedly attached to said steering member,
   (c) a vertical pin fixedly secured at its ends to said upper and said lower lever arms, and
 (B) a vertically extending sleeve fixedly secured to said bogie and rotatably receiving said pin of said actuating member.

2. A twin axle bogie as defined in claim 1 including a pair of parallel spaced, longitudinally extending leaf spring assemblies having front ends secured to said front axle and rear ends secured to said rear axle, said steering member is formed of a pair of forwardly converging plate members joined in a front terminus, each of said plate members has a forked rear terminus straddling said rear axle at spaced locations, said front terminus of said steering member is hingedly attached to said lower lever arm of said actuating member approximately at the height level of said leaf spring assemblies.

3. A twin axle bogie as defined in claim 1 including a pair of parallel spaced, longitudinally extending leaf spring assemblies having front ends secured to said front axle and rear ends secured to said rear axle, a transversal beam extending between said front and said rear axles and supporting said leaf spring assemblies, a pair of transversally spaced, upwardly extending, inverted U-shaped brackets secured to said transversal beam, said lower race way fixedly secured to the upper portion of said brackets.

4. A twin axle bogie as defined in claim 1 wherein said upper lever arm of said actuating member is hingedly attached to said chassis through a lengthwise adjustable link.

5. A twin axle bogie as defined in claim 1 including means for urging said bogie into a position for straight line travel of the vehicle, said means is formed of an arcuately notched plate member affixed to one of said race ways and a wedge-shaped member attached to the other one of said race ways, means exerting a force to said wedge-shaped member urging the same against said notched plate member.

6. A twin axle bogie as defined in claim 1 including means for immobilizing said race ways with respect to one another during back-up travel of the vehicle, said means is formed of complemental locking members secured to said race ways and means operable at will for causing said locking members to assume an interlocking position.

7. A twin axle bogie as defined in claim 1 wherein the swiveling axis of said bogie and the center line of said vertical pin are disposed parallel with and horizontally spaced from one another.

8. A twin axle bogie as defined in claim 4, whereby said link is hingedly connectable to said upper lever arm at any of a plurality of preselected locations thereof to vary the effective length ratio between said upper and said lower lever arms.

References Cited

UNITED STATES PATENTS

| 2,848,244 | 8/1958 | Georgi | 280—81 |
| 3,051,506 | 8/1962 | Stump | 280—81 |
| 3,430,985 | 3/1969 | Hildebrandt et al. | 280—81 |

FOREIGN PATENTS

| 1,162,103 | 3/1958 | France. |
| 964,713 | 7/1964 | Great Britain. |

KENNETH H. BETTS, Primary Examiner

U.S. Cl. X.R.

280—104.5